United States Patent
Dicken et al.

(10) Patent No.: US 10,774,971 B2
(45) Date of Patent: Sep. 15, 2020

(54) CONNECTING MULTI-BORE STRUCTURES IN WATER

(71) Applicant: Subsea 7 Limited, Sutton (GB)

(72) Inventors: Robert Dicken, Stonehaven (GB); Edward Harvey Jamieson, Banchory (GB); David Charles Murray, Ballater (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 16/269,461

(22) Filed: Feb. 6, 2019

(65) Prior Publication Data

US 2020/0011468 A1    Jan. 9, 2020

(30) Foreign Application Priority Data

Jun. 5, 2018    (GB) .................................. 1809222.1

(51) Int. Cl.
*F16L 55/11*    (2006.01)
*F16L 1/26*    (2006.01)
*F16L 23/02*    (2006.01)

(52) U.S. Cl.
CPC ............. *F16L 55/11* (2013.01); *F16L 1/26* (2013.01); *F16L 23/02* (2013.01); *F16L 2201/40* (2013.01)

(58) Field of Classification Search
CPC ........... F16L 11/00; F16L 1/26; F16L 2201/40
USPC .................................. 405/169, 170; 138/89
See application file for complete search history.

(56) References Cited

U.S. PATENT DOCUMENTS

| | | | | |
|---|---|---|---|---|
| 3,136,133 A | * | 6/1964 | Perret | F16L 1/163 405/170 |
| 3,338,499 A | * | 8/1967 | Gilbert | B23K 9/326 228/57 |
| 3,407,611 A | * | 10/1968 | Coultrup | F16L 1/26 405/170 |
| 3,631,870 A | * | 1/1972 | Livingston | F16L 55/1003 137/13 |
| 3,736,400 A | * | 5/1973 | Spiegel et al. | B23K 9/325 219/60 A |
| 3,785,160 A | * | 1/1974 | Banjavich et al. | B23K 5/22 405/170 |
| 4,003,393 A | * | 1/1977 | Jaggard et al. | B08B 9/0555 137/15.07 |
| 4,114,655 A | * | 9/1978 | Bloker | B65D 59/02 138/112 |
| 4,252,465 A | * | 2/1981 | Broussard et al. | F16L 1/20 405/158 |

(Continued)

FOREIGN PATENT DOCUMENTS

| | | |
|---|---|---|
| GB | 2 267 945 | 12/1993 |
| GB | 2557631 | 6/2018 |

(Continued)

*Primary Examiner* — Tara Mayo-Pinnock
(74) *Attorney, Agent, or Firm* — Levy & Grandinetti

(57) ABSTRACT

A method for connecting sections of a multi-bore structure in water comprises connecting the sections to bring corresponding bores of the sections into mutual alignment while those bores are each closed by a plug that excludes the water from the bores. Then, with the sections connected and the corresponding bores sealed together in fluid communication with each other, the plugs are flushed away in a flushing fluid that flows along the communicating bores.

12 Claims, 4 Drawing Sheets

(56) References Cited

U.S. PATENT DOCUMENTS

Figure 1:
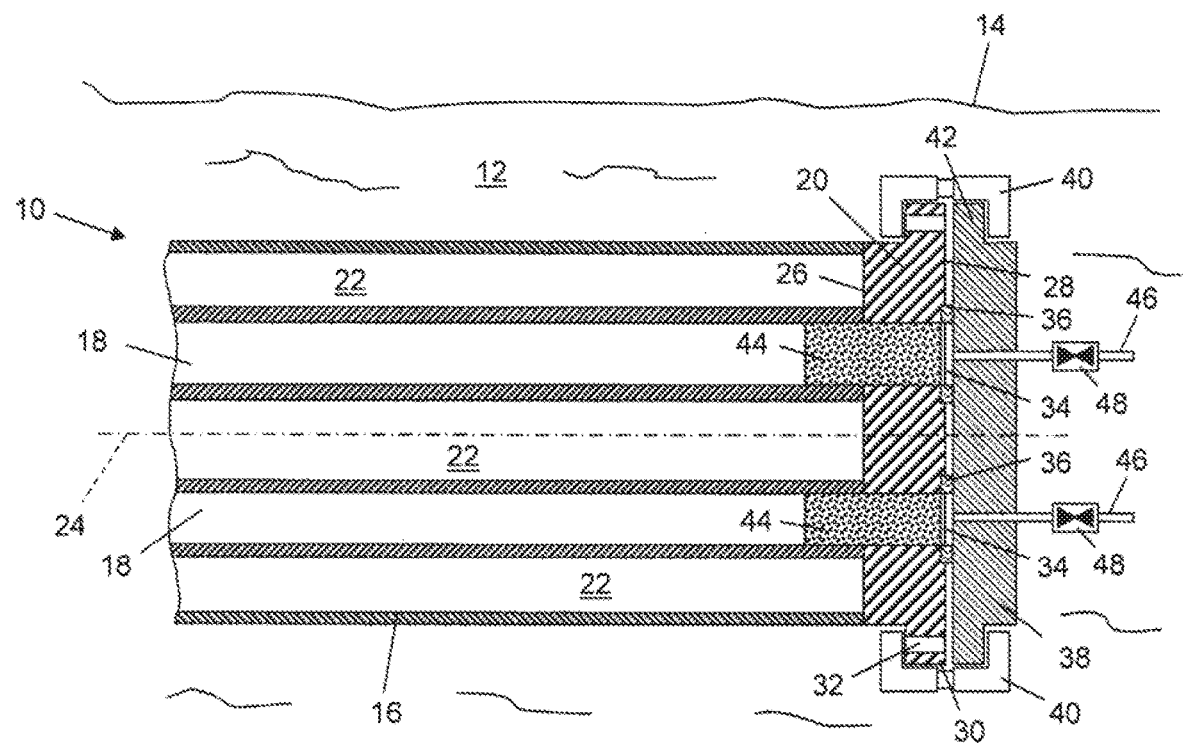

| | | | | |
|---|---|---|---|---|
| 4,357,960 A * | 11/1982 | Han | F16L 55/1608 | 106/217.9 |
| 4,360,290 A | 11/1982 | Ward | | |
| 4,379,722 A * | 4/1983 | Scott | F16L 55/1011 | 106/287.17 |
| 4,523,076 A * | 6/1985 | Laymon | B23K 9/0026 | 219/125.1 |
| 4,607,664 A * | 8/1986 | Carney et al. | E03B 7/003 | 137/67 |
| 4,674,772 A * | 6/1987 | Lycan | F16L 13/04 | 285/22 |
| 4,739,799 A * | 4/1988 | Carney et al. | E03B 7/003 | 137/67 |
| 4,778,306 A * | 10/1988 | Anselmi et al. | F16L 1/165 | 405/136 |
| 5,318,075 A * | 6/1994 | Roll | F16L 55/11 | 138/89 |
| 6,267,001 B1 * | 7/2001 | Duncan | F16K 13/04 | 137/68.11 |
| 6,392,193 B1 * | 5/2002 | Mallenahalli | B23K 9/0216 | 219/130.01 |
| 6,619,326 B1 * | 9/2003 | Pryne | F16L 55/1011 | 138/89 |
| 6,634,430 B2 * | 10/2003 | Dawson et al. | E21B 43/305 | 166/381 |
| 7,112,358 B1 * | 9/2006 | Hacikyan | B23K 9/325 | 428/40.1 |
| 7,632,556 B1 * | 12/2009 | Hacikyan | B23K 9/32 | 138/89 |
| 8,061,388 B1 * | 11/2011 | O'Brien et al. | F16L 55/1011 | 138/89 |
| 8,540,137 B1 * | 9/2013 | Hacikyan | B23K 9/326 | 228/219 |
| 8,616,432 B1 * | 12/2013 | Hacikyan | B23K 9/0061 | 228/42 |
| 8,919,367 B2 * | 12/2014 | Dombrowski | E03F 5/041 | 137/15.08 |
| 2006/0068142 A1 * | 3/2006 | Hacikyan | B23K 9/326 | 428/40.1 |
| 2011/0151166 A1 * | 6/2011 | Hacikyan | B23K 9/32 | 428/40.1 |

FOREIGN PATENT DOCUMENTS

| | | |
|---|---|---|
| WO | WO 2005/107995 | 11/2005 |
| WO | WO 2010/021628 | 2/2010 |
| WO | WO 2010/055334 | 5/2010 |
| WO | WO 2010/055335 | 5/2010 |
| WO | WO 2014/022130 | 2/2014 |
| WO | WO 2017/215387 | 12/2017 |

* cited by examiner

CONNECTING MULTI-BORE STRUCTURES IN WATER

This invention relates to the challenges of connecting or assembling multi-bore structures or systems in water, such as pipeline bundles or riser structures as used in the subsea oil and gas industry.

Pipeline bundles will be used in this specification to exemplify multi-bore subsea structures to which the invention may be applied. Those skilled in the art will appreciate that the invention may also be applied to the fabrication or assembly of other multi-bore subsea structures, such as riser towers.

Pipeline bundles provide robust, efficient and easily-installed subsea flowline systems. For example, pipeline bundles may be installed in oil fields to connect or 'tie back' subsea production wells or manifolds to host facilities or to subsea tie-in points.

The most common pipeline bundle configurations comprise flowline pipes and a carrier pipe. The flowline pipes carry production fluids that contain oil and/or gas and the carrier pipe contributes structural strength. Some pipeline bundle configurations place the flowline pipes around a carrier pipe that serves as a structural spine. Other pipeline bundle configurations enclose the flowline pipes within a carrier pipe that surrounds the flowline pipes.

The flowline pipes and the carrier pipe are typically of steel but either or both could, in principle, be of composite material. Additional layers or components can be added to the pipes, such as an internal liner or an outer coating. Such additional layers or components can comprise polymer, metal or composite materials. Also, flowline pipes can be single-walled or of double-walled pipe-in-pipe (PiP) construction.

Other elongate elements such as pipes and cables are typically included in a pipeline bundle, extending in parallel with the flowlines to carry other fluids, power and data signals along the bundle. Longitudinally-distributed transverse spacers hold the flowlines and other elongate elements relative to the carrier pipe and to each other.

Where flowlines are enclosed within a carrier pipe, the carrier pipe protects the flowlines and any parallel elongate elements both mechanically and against corrosion. By surrounding a sealed hollow chamber within, the carrier pipe contributes buoyancy that enables the bundle to be towed to an installation site. The carrier pipe may also contribute significantly to thermal insulation.

A typical pipeline bundle is a few kilometres in length, for example approximately 2 km long. The length of a pipeline bundle is constrained by the availability of land at onshore fabrication facilities such as spoolbases. In principle, therefore, the maximum continuous length of a pipeline bundle is about 7 km. However, most pipeline bundles are considerably shorter. There is a need for longer pipeline bundles; in particular, the distance between subsea connection points to be connected by a subsea 'tie back' can exceed the length of available fabrication facilities.

Various techniques have been used or proposed to allow the use of longer pipeline bundles. In general, these techniques involve the assembly of two or more shorter bundle sections end-to-end to form a bundle that is as long as the aggregate length of the bundle sections. They therefore present the challenge of how to connect together adjoining bundle sections, both mechanically and for fluid communication between them.

One known technique involves installing two or more conventional bundle sections separately, with individual towing and lowering operations, and subsequently connecting them together on the seabed via tie-in spool or jumper pipes. For this purpose, each bundle section may be equipped with towheads that have valves, connectors and manifolds arranged to facilitate subsea connection of spool or jumper pipes between successive bundle sections. However, this technique requires multiple offshore operations and the creation of multiple critical interfaces deep underwater. Also, the cost of equipping multiple bundle sections with towheads may be prohibitively high.

Reducing the number of subsea-connected interfaces simplifies the installation and testing process. For example, when fabricating an elongate subsea structure such as is disclosed in WO 2010/055334 and WO 2010/055335, successive bundle sections may be manufactured onshore and then pulled into the water as they are joined.

Welding is preferred to join together bundle sections because it ensures leak-tightness and mechanical strength. The sections may, for example, be welded together in a dry chamber defined within a cofferdam situated just offshore from an onshore fabrication facility. Welding can also be done onshore, for example on a beach beside such a fabrication facility. In either case, a first, downstream bundle section is partially immersed in the sea or floats on the sea while being joined to a second, upstream bundle section that remains accommodated wholly or partially in the fabrication facility. A drawback of this technique is the difficulty of testing the multiple welds that are used to join the flowlines and to fabricate the carrier pipe.

GB 2267945 teaches that successive bundle sections may be connected together on a vessel floating offshore. This is complex and expensive because it requires the presence of the vessel, and sufficient hoisting equipment and deck space on the vessel to perform tie-in operations and testing.

The Applicant's GB 2557631 discloses techniques for assembling pipeline bundles by connecting together shorter sections or portions of such bundles end-to-end. Each bundle section comprises a rigid carrier pipe having at least one end closed by a transverse bulkhead, and one or more flowlines each in fluid communication with a respective opening that penetrates the bulkhead.

Leak-tight coupling between successive flowlines of GB 2557631 is effected when the bulkheads of two such bundle sections are clamped together. This forces together complementary fluid coupling formations on the opposed outer faces of the bulkheads, such as spigots or recesses that surround the openings.

Conveniently, interconnection of bundle sections of GB 2557631 may be performed by a wet-mating operation when the bundle sections are both immersed in water, floating at or near the surface. The bulkheads thereby serve as hubs of wet-mate connectors that connect the adjoining bundle sections fluidly and mechanically.

As a wet-mating operation takes place when the bundle sections are at least partially underwater, the flowlines are prone to being flooded by seawater before the bundle sections are joined together. Flooding the flowlines with seawater complicates buoyancy management and promotes internal corrosion.

The flowline terminations could comprise valves that can be closed to prevent flooding with seawater during assembly of a pipeline bundle. However, valves are bulky and expensive; also, the process of opening the valves during pre-commissioning of the bundle adds complexity and expense. These problems are exacerbated because multiple flowlines require multiple valves.

For single pipelines, the risk of flooding may be mitigated by inserting a solid plug into the pipeline, such as an inflatable plug or pig that is removed during pre-commissioning. U.S. Pat. No. 4,360,290 discloses a typical plug for this purpose. However, for a multi-bore subsea structure such as a pipeline bundle, managing multiple plugs in multiple flowlines would be very complex and slow. An alternative solution is required for multi-bore structures.

The present invention therefore replaces a solid isolation plug with a plug that can be dissolved, degraded, dissociated or fragmented by contact with or immersion in any suitable fluid and then flushed away. For example, some embodiments of the invention provide a water-soluble plug that may be of paper.

Water-soluble paper plugs are known from WO 2014/1022130 but are only used in operations that expose them to minimal differential fluid pressure, in particular purging with inert gas when butt-welding pipe sections. In this respect, it is necessary to purge the interior of the pipe in the vicinity of the weld to prevent corrosion and the formation of oxides in the weld pool. Plugs known as purge dams are used conventionally for this purpose, placed on opposite sides of the weld zone. A purge gas can then be injected between the purge dams to drive off atmospheric contaminants.

An advantage of water-soluble purge dams is that they can be placed close together to minimise the volume of purge gas required, and then can be removed after welding by dissolving them with water introduced into the pipe. In this respect, pipe systems often undergo hydrostatic pressure testing or flushing with water prior to use.

In WO 2005/107995, a purge dam comprises adhesive to better withstand differential gas pressure. However, such a design would not be capable of withstanding a relative pressure of 2 bars or more.

Against this background, the invention resides in a method for connecting sections of a multi-bore structure in seawater. The method comprises: connecting the sections to bring corresponding bores of the sections into mutual alignment while those bores are closed by respective plugs that exclude seawater from the bores; and with the sections connected and the corresponding bores sealed together in fluid communication with each other, flushing away the plugs in a flushing fluid that flows along the communicating bores. The plugs are suitably dissolved and/or fragmented in the flushing fluid.

Before connecting the sections, the plugs may initially be shielded from seawater and the exposed to seawater, for example by removing one or more water-tight caps from the bores to expose the plugs to seawater. The or each cap may be of metal, polymer or composite material.

The method of the invention allows the sections to be connected when the bores are substantially submerged in seawater.

To manage overpressure, gas may be allowed to escape from at least one of the bores around a plug situated in that bore. For example, the plug may be deformed under fluid pressure exerted by the gas.

The flushing fluid suitably contains water and preferably is substantially fresh water. The flushing fluid may instead, or additionally, contain a glycol.

A plug may be exposed to a differential fluid pressure of at least two bars before the sections are connected.

The plugs may be force-fitted into the bores with an interference fit. The plugs may instead, or additionally, be bonded into the bores.

Advantageously, the plugs may be exposed to seawater for at least one hour before the sections are connected, while the plugs continue to keep the bores closed.

The inventive concept also embraces a plug for temporarily isolating a flowline bore from water, the plug comprising a body of substantially circular cross-section surrounded by a slide-resistant bore interface, the body being made of a liquid-degradable flushable material that is capable of substantially maintaining its structural integrity for at least one hour of exposure to seawater.

The interface may, for example, comprise a water-soluble adhesive and/or an alternating series of circumferential ridges and grooves.

The flushable material preferably comprises a soluble material, for example a material that is soluble in fresh water or in a glycol. Such a material may be substantially more soluble in fresh water or in a glycol than in seawater.

The flushable material may comprise an organic composite, a paper or a non-Newtonian gel.

The plug may further comprise a barrier layer supported on the body, for example on at least one end of an elongate body, which layer is more resistant than the material of the body to degradation in seawater. In that case, the barrier layer may conveniently rely for its structural integrity on the support of the body.

The inventive concept also extends to a section of a multi-bore structure, fitted with at least one plug of the invention to define an interface between the plug and a bore of the section. The plug may be an interference fit in a bore of the section and/or may be bonded to a bore of the section.

The interface is suitably capable of withstanding a pressure differential of at least 2 bars without the plug sliding in the bore. For example, the bore may contain gas at an overpressure of at least 2 bars relative to ambient pressure.

In summary, the invention contemplates the use of a high-friction plug as a barrier to hold back seawater under moderate hydrostatic pressure (typically of less than 3 bars) from the exterior of an exposed pipe end being connected, and/or gas and gas pressure from the interior of the pipe. This prevents seawater entering the pipeline during a connection process that involves wet-mating of flanged hubs or mechanical connectors as opposed to welding underwater.

Once the plug has been exposed to fresh water and/or another chemical, the plug will break down to the extent that it can be removed without pigging the pipeline. However, the plug is designed to resist decomposition and to maintain sealing integrity for at least a minimum time period that is sufficient to assemble a multi-bore subsea structure in water.

The plug is made from a soluble material that s strong enough to withstand the pressure differentials expected in use and to maintain an interference fit with the inner wall of the pipe. The plug must be strong enough to maintain the required friction at its interface with the surrounding pipe or bore, but must still be able to dissolve or otherwise change to a flushable state within a reasonable timeframe. The material may be an organic composite with soluble glues shaped as a solid cylindrical plug and/or with fins that allow the passage of gas from within the pipe above a certain differential pressure.

Embodiments of the invention implement a method for connecting underwater two sections of multi-bore elongate structures. The method comprises: providing a first section of multi-bore elongate structure, closed by a removable water-tight cap at an end to be connected, at least one bore of that first section containing a temporary plug; providing a second section of multi-bore elongate structure, closed by a removable water-tight cap at an end to be connected, at least one bore of that second section containing a temporary plug; removing both caps; connecting both ends; and, at a later stage, flushing the temporary plugs.

Embodiments of the invention also provide a water-soluble plug for temporarily isolating a flowline bore from seawater, the plug comprising a body made of water-soluble material able to withstand contact with seawater for at least one hour before dissolving, and a non-sliding interface with the bore.

Each plug may comprise an interface reliant upon friction with the associated bore and/or a water-soluble adhesive, the interface being arranged to withstand a pressure differential of at least 2 bars.

The plug may be made of, or comprise, a paper or a gel. More generally, the plug may be made of, or comprise, a soluble material that dissolves in fresh water or in monoethylene glycol (MEG) but not in seawater, or that dissolves substantially more readily in fresh water or in MEG than in seawater. For example, sugar dissolves more quickly in fresh water than in seawater. Some materials such as paper may dissolve into water that contains MEG. MEG may also rapidly degrade some elastomers such as silicone rubbers and polyacrylate rubbers.

Figure 2:
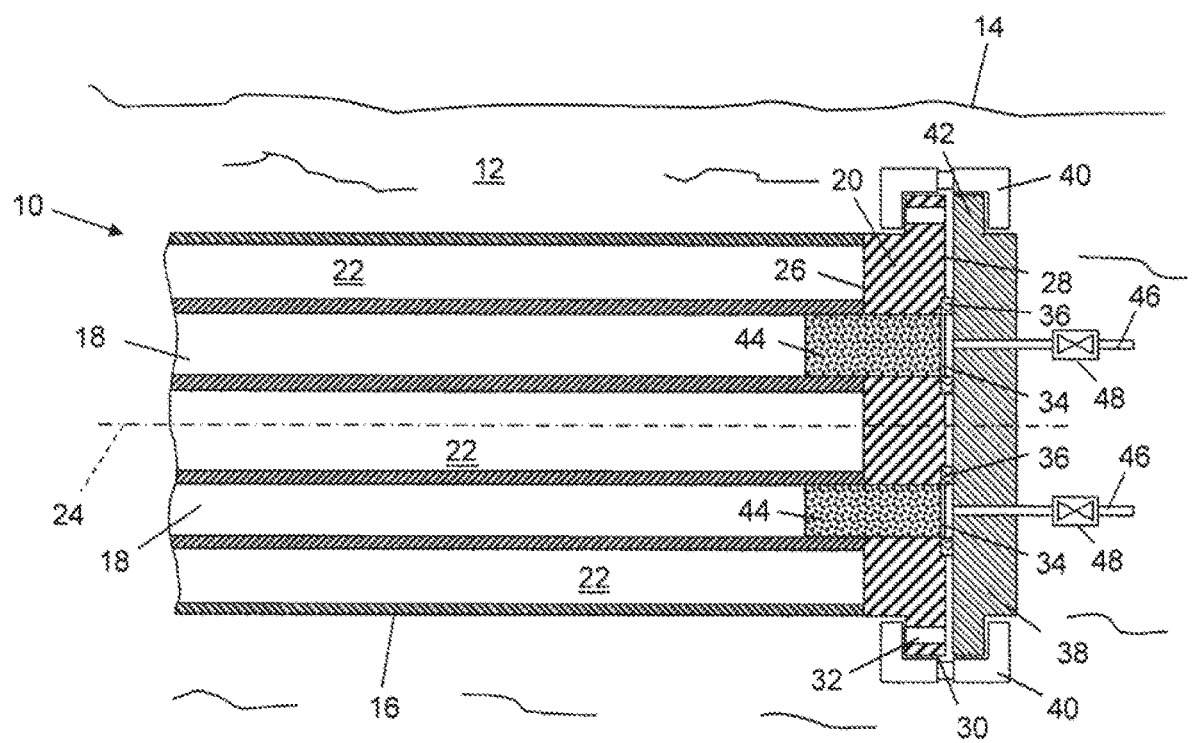
Figure 3:
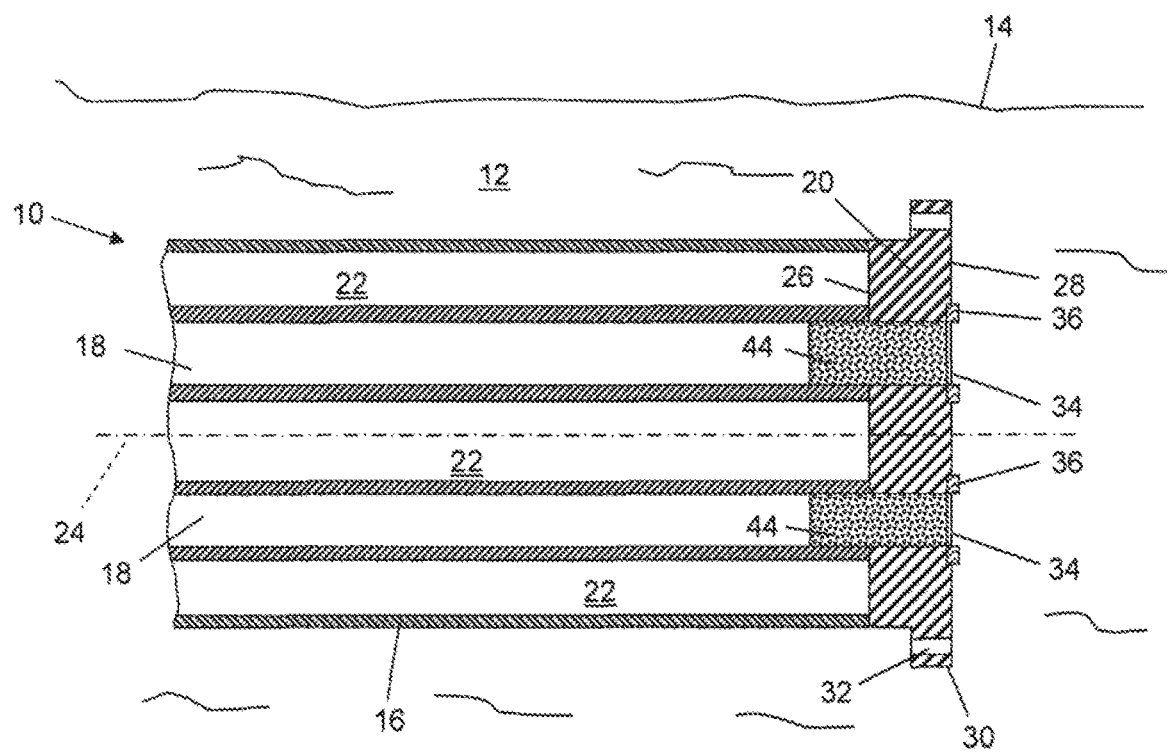
Figure 4:
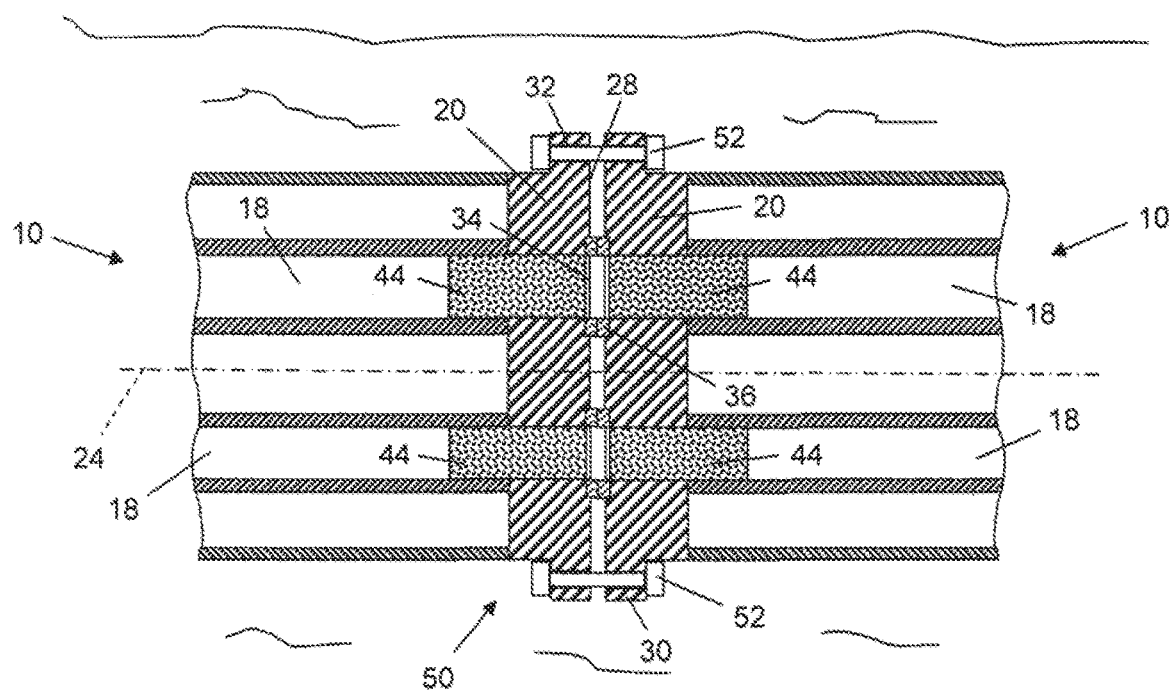
Figure 5:
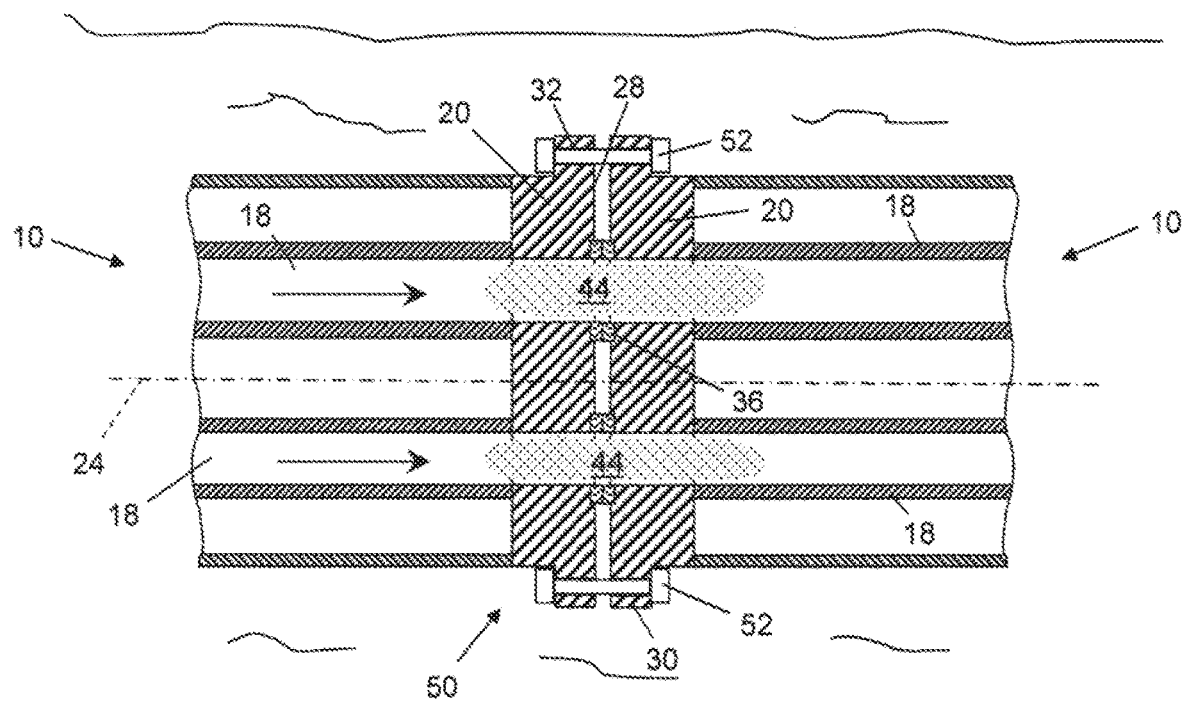
Figure 6:
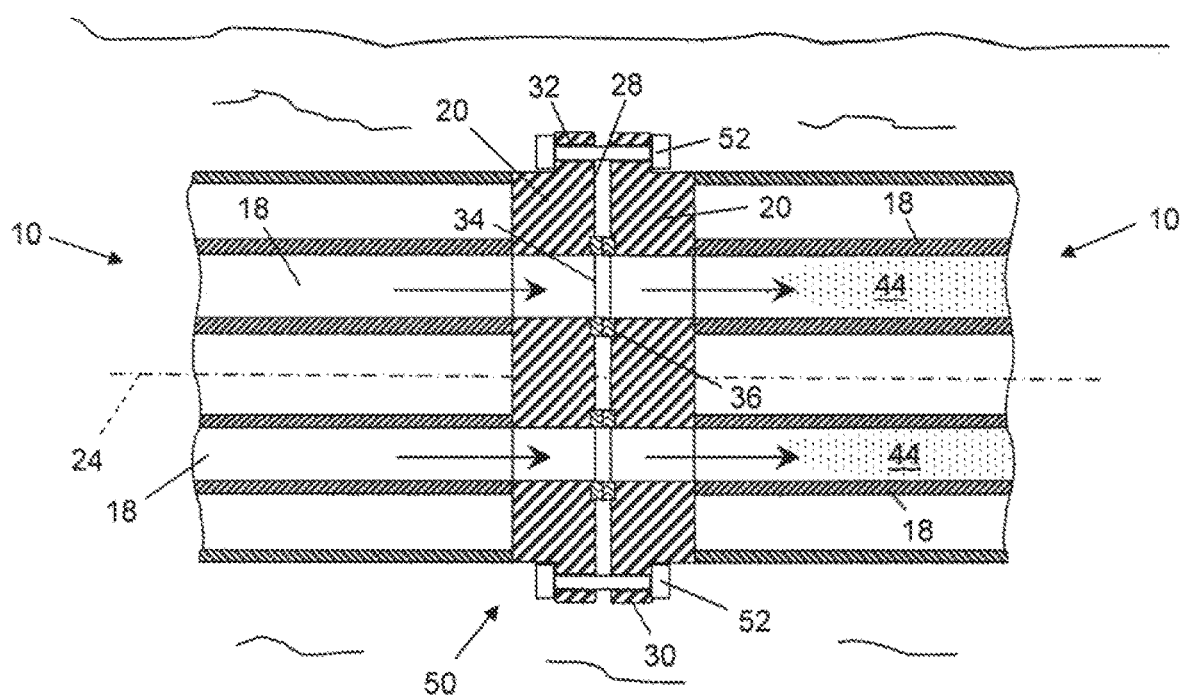
Figure 7:
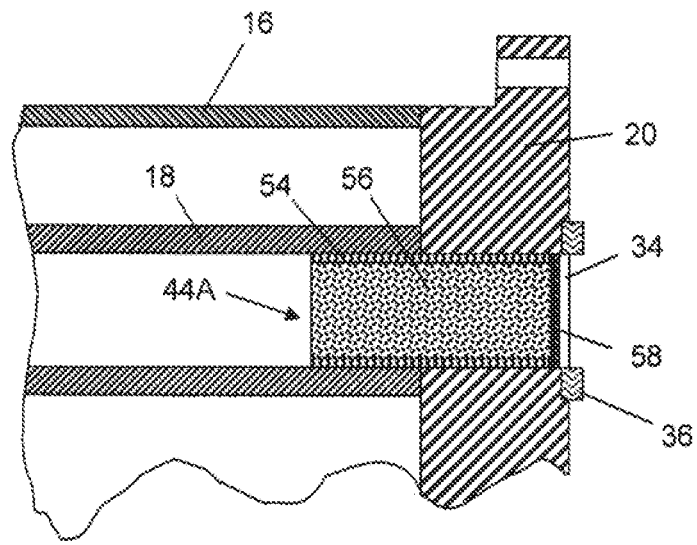
Figure 8:
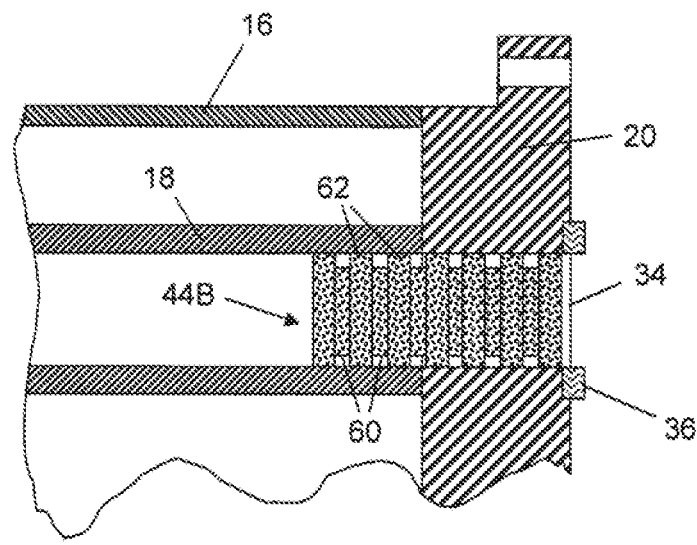

In order that the invention may be more readily understood, reference will now be made, by way of example, to the accompanying drawings in which:

FIG. 1 is a longitudinal sectional view of a pipeline bundle section comprising flowlines or other fluid conduits that contain plugs in accordance with the invention, protected by a removable end cap;

FIG. 2 corresponds to FIG. 1 but shows valves opened to equalise pressure across the end cap;

FIG. 3 corresponds to FIG. 2 but shows the pipeline bundle section with the end cap removed;

FIG. 4 shows two of the pipeline bundle sections of FIG. 3 joined end to end to bring their aligned fluid conduits into fluid communication;

FIG. 5 corresponds to FIG. 4 but shows a flow of a solvent in the fluid conduits dissolving the plugs;

FIG. 6 corresponds to FIG. 5 but shows the dissolved plugs being flushed away along the fluid conduits in the flow of solvent;

FIG. 7 is an enlarged detail view showing a variant of the plugs shown in FIGS. 1 to 4; and FIG. 8 is an enlarged detail view showing a further variant of the plugs shown in FIGS. 1 to 4.

Referring firstly to FIGS. 1 and 2 of the drawings, a pipeline bundle portion or section 10 is shown floating in seawater 12. The bundle section 10 is shown here fully submerged beneath the surface 14 but it could instead be partially submerged and hence may protrude partially above the surface 14.

The bundle section 10 comprises a rigid hollow carrier pipe 16 that surrounds parallel fluid conduits, exemplified here by rigid flowlines 18. The carrier pipe 16 and the flowlines 18 are of steel in this example but any of them could be of composite materials.

The flowlines 18 are shown here as being of single-wall construction although one or more of them could be of PiP construction instead. The carrier pipe 16 will also contain spacers and may contain other elongate elements such as cables, but these conventional details have been omitted for simplicity.

The carrier pipe 16 is closed by transverse bulkheads 20 at its opposed ends, only one of which is shown. This defines a sealed chamber 22 within the carrier pipe 16. The chamber 22 may be packed or charged with a substantially inert gas such as nitrogen that surrounds the flowlines 18.

Optionally, the chamber 22 within the carrier pipe 16 may be pressurised to an elevated pressure to counteract hydrostatic pressure at the water depth anticipated during towing or installation. In some applications, it would also be possible for the chamber 22 to be flooded in a controlled manner for buoyancy control or to settle the bundle onto the seabed.

The flowlines 18 may also be pressurised to an elevated pressure to counteract hydrostatic pressure at the water depth anticipated during towing or installation. For example, the flowlines 18 may be packed or charged with a substantially inert gas such as nitrogen at a gauge pressure that exceeds the expected ambient water pressure by say 2 bars. This excess pressure helps to prevent seawater 12 entering the flowlines 18.

The bulkhead 20 is a disc-shaped machined steel forging that extends in a plane orthogonal to a central longitudinal axis 24 of the bundle section 10. The bulkhead 20 has an inner face 26 that faces axially inwardly toward the inside of the associated carrier pipe 16 and an outer face 28 that faces axially outwardly away from the associated carrier pipe 16. The inner face 26 of the bulkhead 20 is welded around its periphery to an end of the carrier pipe 16.

A circumferential flange 30 protrudes radially from the bulkhead 20. The flange 30 is penetrated by a circumferential array of axially-extending holes 32.

The bulkhead 20 is penetrated by axially-extending openings 34 whose positions correspond to the angular and radial positions of the flowlines 18 within the carrier pipe 16 about the central longitudinal axis 24. The flowlines 18 are welded to the inner face 26 of the bulkhead 20 around the peripheries of the respective openings 34 in a leak-tight manner, such that the openings 34 are in fluid communication with the interior of the flowlines 18.

Each opening 34 is surrounded by a resilient annular gasket or seal 36 on the outer face 28 of the bulkhead 20. A disc-shaped end cap 38 is held parallel to the outer face 28 of the bulkhead 20 by clamps 40 that act axially between the flange 30 of the bulkhead 20 and a similar radially-protruding circumferential flange 42 on the end cap 38. The clamps 40 force the end cap 38 axially toward the bulkhead 20 to compress the seals 36. The end cap 38 thereby closes the openings 34 of the bulkhead 20 and hence isolates the interior of the flowlines 18 from the surrounding seawater 12, in addition to protecting the seals 36.

In accordance with the invention, the flowlines 18 are also sealed by plugs 44. In this example, the plugs 44 are cylindrical blocks that extend from the flowlines 18 into the openings 34 in the bulkhead 20. The plugs 44 could instead be positioned wholly in the flowlines 18 or wholly in the openings 34.

There is an interference fit between each plug 44 and the surrounding wall defined by the interior of the flowline 18 and the opening 34 in the bulkhead 20. Thus, each plug 44 may be force-fitted into the bore defined by that surrounding wall.

The plugs 44 are made from a rigid soluble material such as a paper or an organic composite comprising a soluble adhesive or matrix. The plugs 44 may instead, or additionally, comprise a non-Newtonian gel material such as agar or another gel.

Whilst they are rigid to the extent of being self-supporting and pressure-resistant, the plugs 44 may have some flexibility or resilience to conform to, and to seal against, the surrounding wall defined by the interior of the flowline 18 and the opening 34 in the bulkhead 20.

The end cap 38 must be removed from the bundle section 10 to enable end-to-end coupling with another bundle section 10 as shown in FIG. 4. For this purpose, equalising tubes 46 communicate with the small cavities within the seals 36 between the bulkhead 20 and the end cap 38. Fluid flow along each equalising tube 46 is controlled by a respective valve 48, for example a needle valve.

The valves 48 are normally closed, as shown in black in FIG. 1. When the end cap 38 is to be removed from the bundle section 10, the valves 48 are opened as shown in white in FIG. 2. This equalises the pressure in the cavities within the seals 36 with the ambient pressure of the surrounding seawater 12. Equalising the pressure in this way enables the end cap 38 to be removed from the bulkhead 20, as shown in FIG. 3, after releasing and removing the clamps 40.

When the end cap 38 has been removed as shown in FIG. 3, the plugs 44 continue to isolate the interior of the flowlines 18 from the surrounding seawater 12, at least for long enough to enable end-to-end coupling with another floating bundle section 10 as shown in FIG. 4. That coupling operation may be expected to take at least an hour.

Referring now to FIG. 4 in detail, this shows two bundle sections 10 coupled together end-to-end and in mutual alignment along their common central longitudinal axis 24. The outer faces 28 of their bulkheads 20 face each other across their mutual interface. The bulkheads 20 transmit forces between, and provide for leak-tight fluid communication between, the adjoining bundle sections 10. Two or more bundle sections 10 may be joined in this way to make a longer pipeline bundle assembly 50.

When the bundle sections 10 are brought together end-to-end to form a bundle assembly 50 as shown, the openings 34 of each bulkhead 20 align with their counterparts in the opposing, facing bulkhead 20. Hence, when the correctly-aligned bulkheads 20 are brought together in an axial or longitudinal direction parallel to the central longitudinal axis 24, the seals 36 around the opposed openings 34 cooperate and seal together.

The cooperating openings 34 together form respective longitudinal passages that extend parallel to the central longitudinal axis 24. The seals 36 act in compression between the outer faces 28 of the coupled bulkheads 20 to maintain leak-tightness in those passages. The passages thereby enable leak-proof fluid communication along the bundle assembly 50 from the flowlines 18 of one bundle section 10 through the openings 34 to the flowlines 18 of the next bundle section 10.

The bulkheads 20 are pressed together mechanically and held together in a state of mutual axial compression by a ring of bolts 52 that act in axial tension. The bolts 52 are received in respective aligned holes 32 in the parallel circumferential flanges 30 of the bulkheads 20. The bolts 52 therefore encircle the bundle assembly 22 and extend parallel to the central longitudinal axis 24.

The arrows in the flowlines 18 in FIG. 5 show a solvent liquid such as fresh water or MEG now introduced into the flowlines 18 and starting to dissolve the plugs 44. The remnants of the plugs 44 are thereby entrained in the flow of solvent liquid as shown in FIG. 6 and flushed away, hence being removed without requiring pigging of the flowlines 18.

Turning finally to FIGS. 7 and 8, these drawings show variants of the plug 44.

FIG. 7 shows a first variant 44A of the plug 44. The plug 44A has an optional high-grip layer or coating 54 on the cylindrically-curved radially-outermost surface of its body 56. The high-grip coating 54, which may be of adhesive or a resilient material, supplements the frictional engagement between the plug 44A and the surrounding wall defined by the interior of the flowline 18 and the opening 34 in the bulkhead 20. The high-grip coating 54 is preferably soluble in the same solvent that can dissolve the body 56 of the plug 44A.

The plug 44A shown in FIG. 7 also has an optional barrier layer 58 at an exposed end of the body 56. The barrier layer 58 may be more resistant than the body 56 of the plug 44A to dissolution in seawater. In this way, the barrier layer 58 protects the body 56 from premature dissolution when the end cap 38 is removed.

Optionally, the barrier layer 58 and/or the high-grip coating 54 is mechanically weak relative to the supporting body 56 of the plug 44A and relies for its integrity on the greater mechanical strength of the body 56. Thus, when the body 56 eventually dissolves in a flow of solvent in the flowline 18, the barrier layer 58 and/or the high-grip coating 54 will fragment readily into particles that are entrained in the flow and flushed away.

FIG. 8 shows a second variant 44B of the plug 44. Here, the plug 44B is encircled by circumferential grooves 60 that define radially-extending circumferential ridges or fins 62. The grooves 60 allow the fins 62 to deform longitudinally under differential pressure. Under sufficient differential pressure, deformation of the fins 62 can create a narrow peripheral passageway between the plug 44B and the surrounding wall defined by the interior of the flowline 18 and the opening 34 in the bulkhead 20. Such a passageway is apt to vent any excessive overpressure of gas in the flowline 18, without that overpressure forcing the plug 44B out of the opening 34.

The circumferentially-ridged outer profile of the fins 62 also enhances frictional engagement with the surrounding wall defined by the interior of the flowline 18 and the opening 34 in the bulkhead 20.

The fins 62 of the plug 44B could have longitudinal asymmetry to respond to differential pressure in an asymmetric manner depending upon the direction from which fluid pressure is exerted on the plug 44B. Thus, the fins 62 could deflect in a longitudinally-outward direction more readily than they deflect in a longitudinally-inward direction, hence allowing gas egress from the flowline 18 to release overpressure while resisting water ingress into the flowline 18 in the opposite direction. For example, the fins 62 could have convex curvature on an inner side and concave curvature on an outer side.

Many other variations are possible within the inventive concept. For example, one or more features of the variant plug 44A of FIG. 7 may be combined with one or more features of the variant plug 44B of FIG. 8. Also, instead of using clamps 40, the end cap 38 could be held on the bulkhead 20 by bolts 52 like those used to couple the bundle sections 10 of a bundle assembly 50.

The invention claimed is:

1. A method for connecting sections of a multi-bore structure in seawater, the method comprising:
  connecting the sections to bring corresponding bores of the sections into mutual alignment while those bores are closed by respective plugs that exclude seawater from the bores;
  initially shielding the respective plugs from seawater with watertight caps before connecting the sections;
  subsequently exposing the plugs to seawater by removing the watertight caps from the bores to expose the plugs to seawater before connecting the sections; and with the sections connected and the corresponding bores sealed together in fluid communication with each other, flushing away the plugs in a flushing fluid that flows along the communicating bores;

wherein flushing away the plugs in the flushing fluid comprises dissolving and/or fragmenting the plugs in the flushing fluid.

2. The method of claim 1, comprising connecting the sections when the bores are substantially submerged in seawater.

3. The method of claim 1, comprising allowing gas to escape from at least one of the bores around a plug situated in that bore.

4. The method of claim 3, comprising deforming said plug under fluid pressure of the gas.

5. The method of claim 1, wherein the flushing fluid contains water.

6. The method of claim 5, wherein the flushing fluid is substantially fresh water.

7. The method of claim 1, wherein the flushing fluid contains a glycol.

8. The method of claim 1, comprising exposing at least one of the plugs to a differential fluid pressure of at least two bars before connecting the sections.

9. The method of claim 1, preceded by force-fitting the plugs into the bores with an interference fit.

10. The method of claim 1, preceded by bonding the plugs into the bores.

11. The method of claim 1, comprising exposing the plugs to seawater for at least one hour before connecting the sections, while keeping the bores closed by the plugs.

12. The method of claim 1, comprising equalising the pressure on opposing sides of the respective watertight caps prior to removing the watertight caps.

* * * * *